(12) United States Patent
Margalit et al.

(10) Patent No.: US 8,387,454 B2
(45) Date of Patent: Mar. 5, 2013

(54) FLOW METER CASING HAVING SEGMENTED EXTERNAL RING STRUCTURE

(75) Inventors: Shaul Margalit, Tel Aviv (IL); Nitzan Cohen, Kiryat Tivon (IL); Yoel Ben Moshe, Ein Haemek (IL); Jerry Potter, Mansfield, TX (US)

(73) Assignee: Arad Ltd., Dalia (IL)

( * ) Notice: Subject to any disclaimer, the term of this patent is extended or adjusted under 35 U.S.C. 154(b) by 238 days.

(21) Appl. No.: 12/796,741

(22) Filed: Jun. 9, 2010

(65) Prior Publication Data

US 2011/0108136 A1 May 12, 2011

Related U.S. Application Data

(60) Provisional application No. 61/268,351, filed on Jun. 11, 2009.

(51) Int. Cl.
*G01F 15/14* (2006.01)
(52) U.S. Cl. ............. 73/273; 73/201; 137/343; 137/371
(58) Field of Classification Search .................. 137/371, 137/364; 285/238; 73/201, 273
See application file for complete search history.

(56) References Cited

U.S. PATENT DOCUMENTS

| | | | |
|---|---|---|---|
| 2,738,672 A | 3/1956 | Smith et al. | |
| 3,067,612 A | 12/1962 | Smith | |
| 3,068,696 A | 12/1962 | Smith et al. | |
| 3,363,465 A | 1/1968 | Last | |
| 3,659,457 A | 5/1972 | Ostrowski | |
| 3,731,534 A | 5/1973 | Painley et al. | |
| 4,020,689 A | 5/1977 | Onoda et al. | |
| 4,391,139 A | 7/1983 | Sutherland et al. | |
| 4,478,440 A | 10/1984 | Koch et al. | |
| 4,614,122 A | 9/1986 | Graves | |
| 4,746,775 A | 5/1988 | Pena et al. | |
| 5,339,686 A | 8/1994 | DeJarlais et al. | |
| 5,913,447 A | 6/1999 | Carpenter | |
| 6,426,027 B1 | 7/2002 | Scarborough, III et al. | |
| 6,450,042 B1 * | 9/2002 | Lanham et al. | 73/861.357 |
| D468,222 S | 1/2003 | Koch et al. | |
| 6,789,419 B2 | 9/2004 | Hennebelle | |
| 7,143,645 B2 | 12/2006 | Benson et al. | |
| 7,204,157 B2 * | 4/2007 | Furmidge et al. | 73/861.19 |
| 2009/0106891 A1 * | 4/2009 | Klicpera | 4/605 |

* cited by examiner

Primary Examiner — Harshad R Patel
Assistant Examiner — Roger Hernandez-Prewitt
(74) Attorney, Agent, or Firm — The Webb Law Firm

(57) ABSTRACT

The present invention provides a hybrid fluid flow meter pressure vessel assembly (1) that includes an interior housing (11) fabricated from plastic, and an exterior ring structure (26) fabricated from metal. Interior housing (11) has sidewalls (14) and an internal chamber (17). The sidewalls (14) of the interior housing (11) have first and second apertures (20, 23) that are each in fluid communication with the internal chamber (17). The exterior ring structure (26) encompasses at least a portion of an exterior (29) of the sidewalls (14) of the interior housing (11), and includes outwardly extending first and second conduits (38, 41) that are in respective fluid communication with the first and second apertures (20, 23) of the interior housing (11).

14 Claims, 9 Drawing Sheets

US 8,387,454 B2

FLOW METER CASING HAVING SEGMENTED EXTERNAL RING STRUCTURE

CROSS REFERENCE TO RELATED PATENT APPLICATION

The present patent application is entitled to and claims priority under 35 U.S.C. §119(e) to U.S. Provisional Patent Application No. 61/268,351 filed on Jun. 11, 2009, the disclosure of which is incorporated herein by reference in its entirety.

BACKGROUND OF THE INVENTION

1. Field of the Invention

The present invention relates to pressure vessels for use with fluid flow meters. More particularly, the present invention relates to hybrid fluid flow meter pressure vessel assemblies that include an interior housing fabricated from plastic, and an exterior ring structure fabricated from metal.

2. Description of Related Art

The pressure vessel of a fluid flow meter, such as a water meter, is typically fabricated from metal, such as bronze. Metal pressure vessels provide desirable benefits relating to, for example: resistance to fluid pressure fluctuations and/or pulsations; resistance to stresses due to in-ground shifting of pipes to which the pressure vessel is connected; and resistance to thread stripping. Metal pressure vessels also advantageously provide a continuous electrical connection for electrical grounding purposes. Many building electrical services are generally grounded through the main cold water line, which is often connected to the metal pressure vessel of a fluid flow meter. Metal pressure vessels, however, have certain disadvantages associated with them relating to, for example: increased weight; high material costs (e.g., copper in the case of bronze or red brasses); increased costs relating to fabrication, such as metal machining; and leaching of metals (e.g., lead in the case of bronze) into the fluid (e.g., potable water) that contacts the interior of the metal pressure vessel.

Pressure vessels for fluid flow meters fabricated from plastic materials are known. See, for example, U.S. Pat. Nos. 4,391,139 and 4,478,440. While addressing some of the disadvantages associated with metal pressure vessels (e.g., reduced weight and minimizing metal leaching into the contacted fluid), plastic pressure vessels typically fail to provide some of the advantages associated with metal pressure vessels. For example, plastic pressure vessels are typically prone to thread stripping, and are prone to failure (e.g., cracking) when exposed to stresses due to in-ground shifting of pipes to which the pressure vessel is connected. In addition, plastic pressure vessels typically do not provide sufficient electrical conductivity for grounding purposes.

It would be desirable to develop new pressure vessels, for use with fluid flow meters, that address the disadvantages associated with metal pressure vessels. It would be further desirable that such newly developed pressure vessels also provide the advantages associated with metal pressure vessels.

SUMMARY OF THE INVENTION

In accordance with the present invention, there is provided a fluid flow meter pressure vessel assembly comprising:

(a) an interior housing having sidewalls and an internal chamber, said sidewalls of said interior housing having a first aperture and a second aperture that are each in fluid communication with said internal chamber, said interior housing being fabricated from plastic; and (b) an exterior ring saddle structure encompassing at least a portion of an exterior of said sidewalls of said interior housing, said exterior ring structure comprising a first conduit and a second conduit, said first conduit being in fluid communication with said first aperture of said interior housing, said second conduit being in fluid communication with said second aperture of said interior housing, said first conduit and said second conduit each independently extending outwardly from said exterior ring structure, said exterior ring structure being fabricated from metal, wherein said interior housing and said exterior ring structure are attached to each other.

In accordance with the present invention, there is further provided a fluid flow meter that includes the fluid flow meter pressure vessel assembly as described above.

The features that characterize the present invention are pointed out with particularity in the claims, which are annexed to and form a part of this disclosure. These and other features of the invention, its operating advantages, and the specific objects obtained by its use will be more fully understood from the following detailed description and accompanying drawings in which preferred embodiments of the invention are illustrated and described.

As used herein and in the claims, terms of orientation and position, such as "upper", "lower", "inner", "outer", "right", "left", "vertical", "horizontal", "top", "bottom", and similar terms, are used to describe the invention as oriented in the drawings. Unless otherwise indicated, the use of such terms is not intended to represent a limitation upon the scope of the invention, in that the invention may adopt alternative positions and orientations.

Unless otherwise indicated, all numbers or expressions, such as those expressing structural dimensions, quantities of ingredients, etc., as used in the specification and claims are understood as modified in all instances by the term "about".

BRIEF DESCRIPTION OF THE DRAWINGS

In FIGS. 1-9, like reference numerals designate the same components and structural features, unless otherwise indicated.

DETAILED DESCRIPTION OF THE INVENTION

Figure 1:
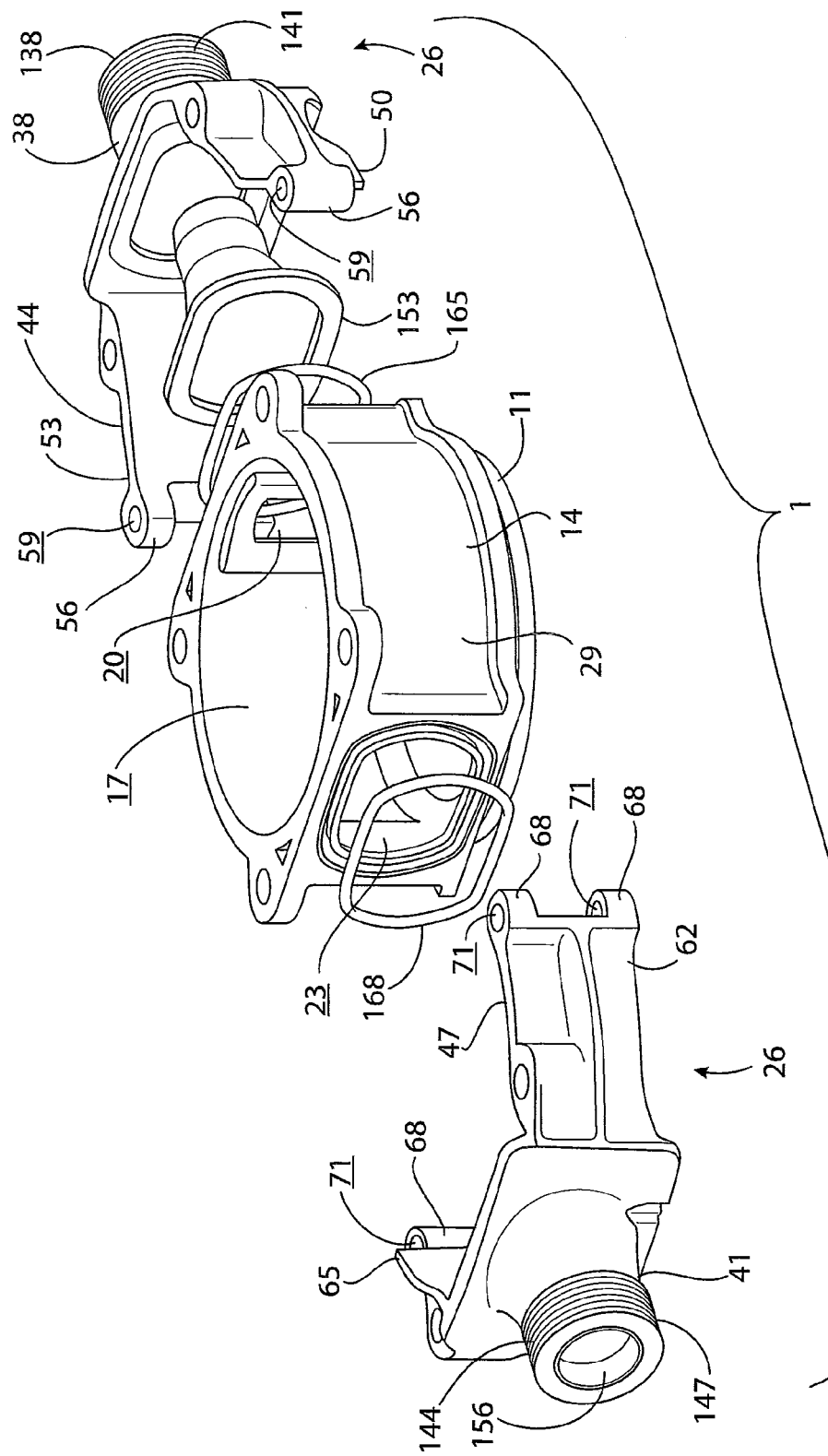
FIG. 1 is a representative exploded perspective view of a fluid flow meter pressure vessel according to the present invention.

With reference to FIG. 1 of the drawings, a pressure vessel (or meter casing) 1 according to the present invention is depicted. Pressure vessel 1 includes an interior housing 11 that has sidewalls 14 and an internal chamber 17. Sidewalls 14 include a first aperture 20 and a second aperture 23, that are each in fluid communication with internal chamber 17. Interior housing 11 is fabricated from plastic, such as thermoplastic materials and/or thermoset plastic materials, as will be discussed in further detail herein.

Interior housing 11 may have any suitable shape. Typically, interior housing 11 has a substantially cylindrical shape, having a horizontal sectional shape selected from circular shapes, oval shapes, irregular shapes, and/or polygonal shapes (e.g., triangular, square, rectangular, pentagonal, hexagonal, heptagonal, octagonal, etc.). As depicted in the drawings, interior housing 11 has a substantially cylindrical shape, having a horizontal sectional shape that is substantially circular. The first aperture 20 and second aperture 23 of interior housing 11 may be positioned at any point in sidewalls 14, relative to each other. Typically, and as depicted in the drawings, the first aperture 20 and the second aperture 23 of interior housing 11 are positioned so as to be substantially opposed from each other.

Figure 8:
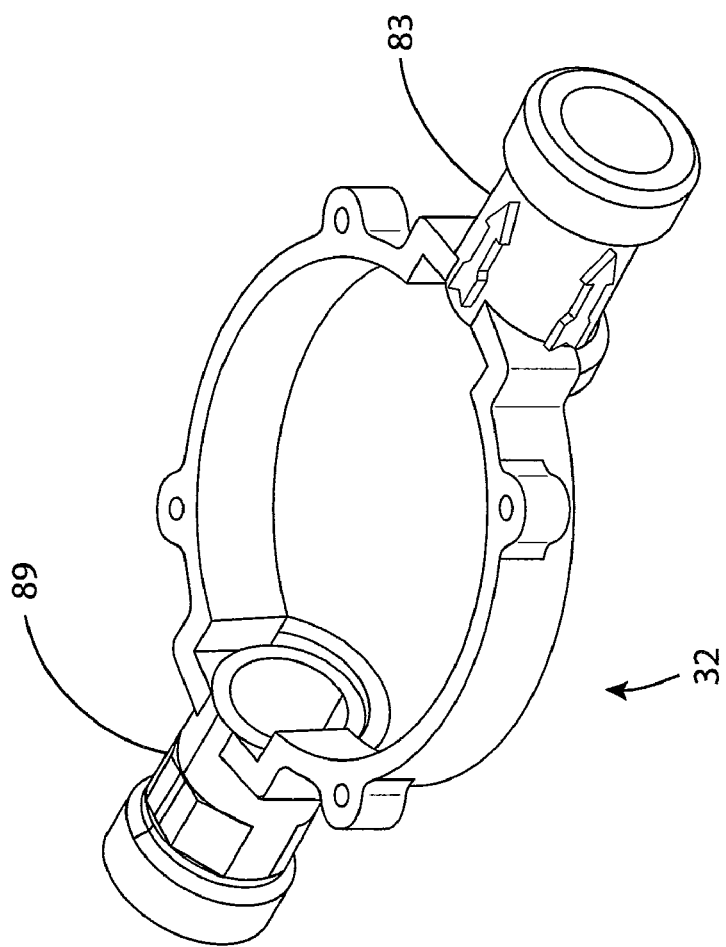
FIG. 8 is a representative perspective view of a substantially unitary exterior ring structure of a fluid flow meter pressure vessel according to the present invention.

Pressure vessel 1 further includes an exterior ring structure 26. Exterior ring structure 26 encompasses at least a portion of the exterior (e.g., exterior sidewall surfaces 29) of sidewalls 14 of interior housing 11. The exterior ring structure 26 may be a substantially unitary exterior ring structure, for example, as depicted with regard to substantially unitary exterior ring structure 32 of FIG. 8. The exterior ring structure may, alternatively, be a multicomponent exterior ring structure that includes at least two components, for example, as depicted with regard to multicomponent exterior ring structure 26 of FIG. 1, and multicomponent exterior ring structure 35 of FIG. 6.

Exterior ring structure 26 includes a first conduit 38 and a second conduit 41, that each extend outwardly from exterior ring structure 26. First conduit 38 is in fluid communication with first aperture 20 of interior housing 11. Second conduit 41 is in fluid communication with second aperture 23 of interior housing 11. Accordingly, first conduit 38 and second conduit 41 are each in fluid communication with internal chamber 17 of interior housing 11.

The exterior ring structure 26 is fabricated from one or more metals, including, alloys of two or more metals. For example, the exterior ring structure may be fabricated from iron, steel, brass, bronze, copper, aluminum, titanium, and combinations thereof. In an embodiment of the present invention, the exterior ring structure 26 is fabricated from brass.

The interior housing 11 and the exterior ring structure 26 are attached to each other. The interior housing and the exterior ring structure 26 may be attached to each other by attachment arrangements selected from, for example, fasteners (including bolts, screws, nut and bolt combinations), and/or adhesives.

The exterior ring structure 26 in an embodiment, provides electrical conductivity between the first conduit 38 and the second conduit 41 thereof. More particularly, the exterior ring structure provides at least sufficient electrical conductivity between the first and second conduits (38, 41) thereof, for electrical grounding purposes. That is, the exterior ring structure allows the pressure vessel of the present invention to be used for purposes of grounding the electrical service of a structure (e.g., a residential house) in which the pressure vessel is used.

In an embodiment of the present invention, the exterior ring structure 26 is a multicomponent exterior ring structure (or an exterior ring structure assembly) that includes at least two components. With further reference to FIG. 1, exterior ring structure 26 includes a first saddle component 44 and a second saddle component 47. First saddle component 44 includes first conduit 38, and second saddle component 47 includes second conduit 41. First saddle component 44 and second saddle component 47 are attached to each other.

The first saddle component 34 and second saddle component 47 of the exterior ring structure 26 may be attached to each other by means of aligned apertures through which fasteners (e.g., bolts, or nut and bolt combinations) are received. First saddle component 44 includes a first terminal end 50 and a second terminal end 53, that each include at least one extension 56 having at least one aperture 59 therein. Second saddle component 47 includes a first terminal end 62 and a second terminal end 65, that each include at least one extension 68 having at least one aperture 71 therein.

Aperture 59 of the first terminal end 50 is aligned with at least one aperture 71 of the first terminal end 62, and together form first aligned apertures 74 (FIG. 2) that are dimensioned to receive a first fastener therethrough (or therein), not visible in the drawings. More particularly, extension 56 of the first terminal end 50 resides between separate upper and lower extensions 68 of the first terminal end 62, and aligned apertures 74 are formed by apertures 71, 59 and 71 (from top to bottom).

Aperture 59 of the second terminal end 53 is aligned with aperture 71 of the second terminal end 65, and together form second aligned apertures (not visible in the drawing figures) that are dimensioned to receive a second fastener therethrough (or therein), not visible in the drawings. More particularly, extension 68 of the second terminal end 65 resides between separate upper and lower extensions 56 of second terminal end 53 of first saddle component 44, and the aligned apertures are formed by apertures 59, 71, 59 (from top to bottom).

In other words, the extensions (or legs) of the first saddle component and the second saddle component engage (or cooperate) with each other as shown, to form the exterior ring structure.

Figure 6:
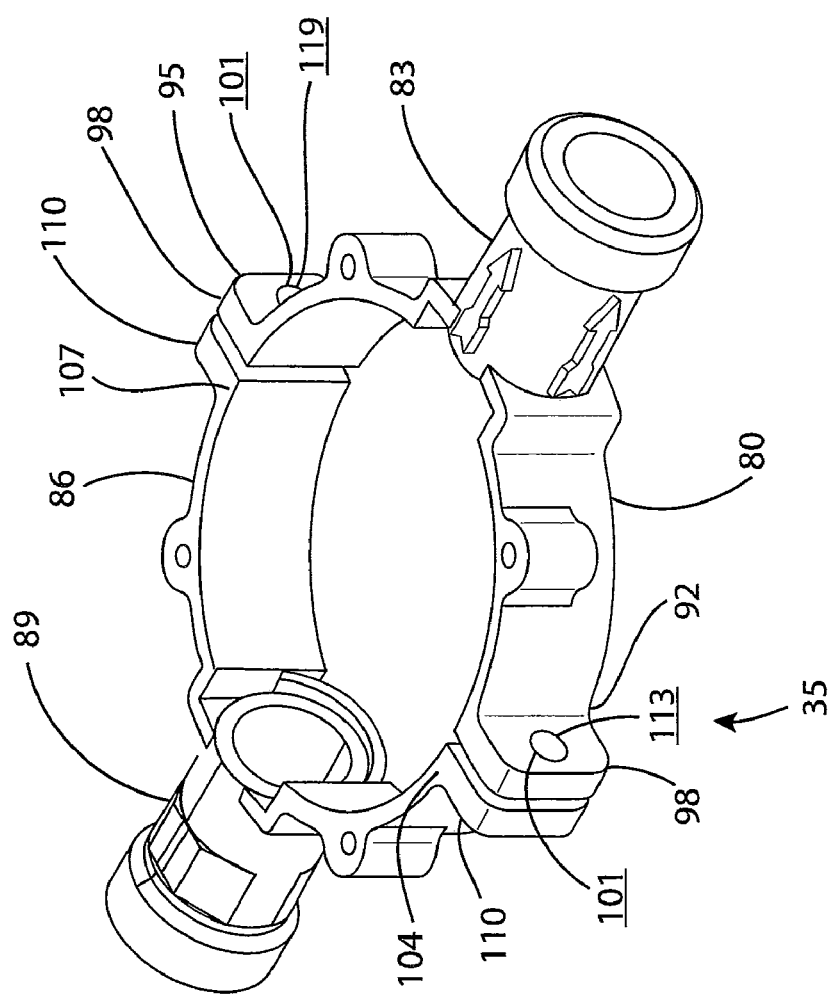
FIG. 6 is a representative perspective view of a two-piece exterior ring structure of a fluid flow meter pressure vessel according to the present invention.
Figure 7:
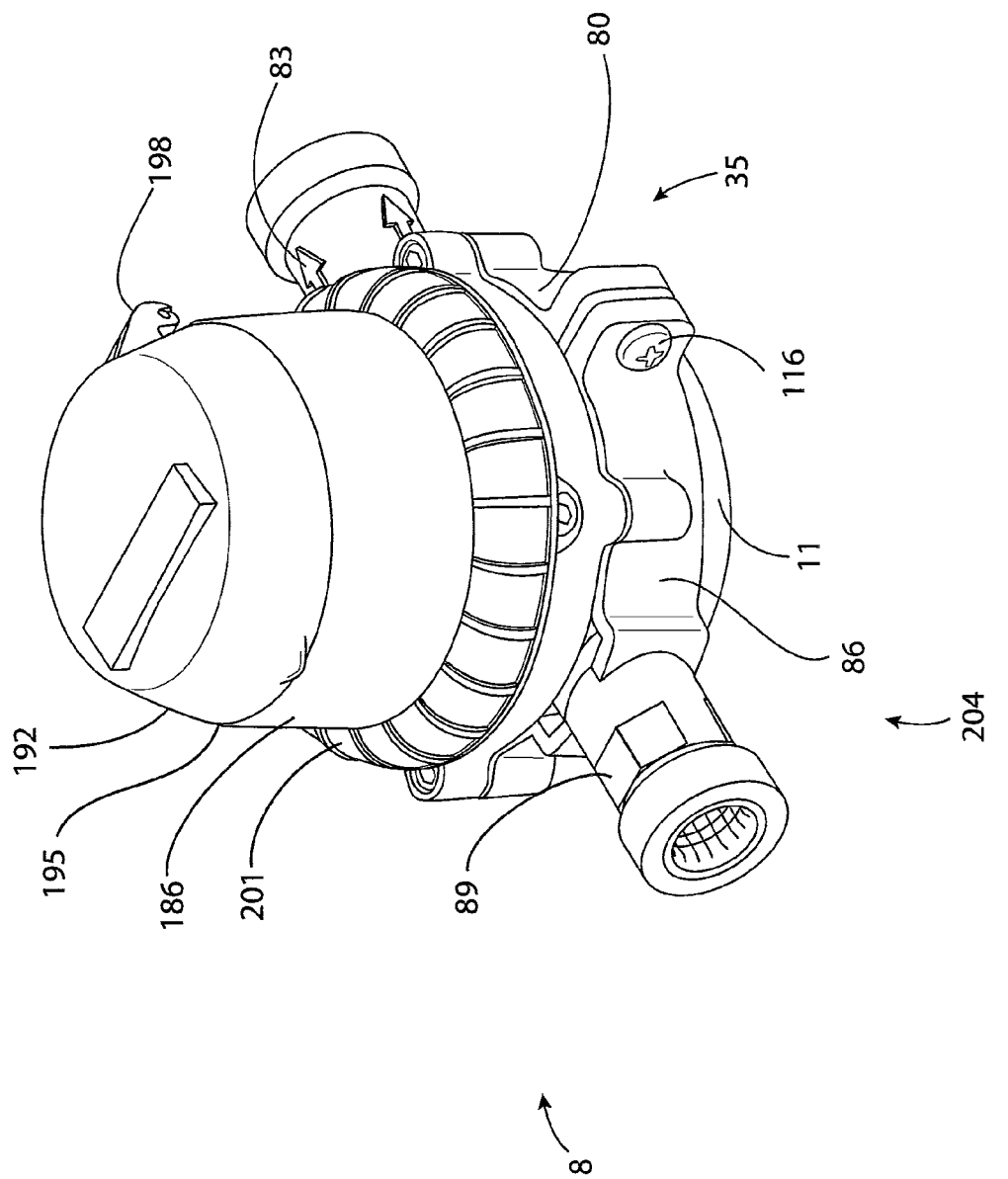
FIG. 7 is a representative perspective view of a fluid flow meter according to the present invention that includes the two-piece exterior ring structure of FIG. 6.

In another embodiment of the present invention, and with reference to FIG. 6, exterior ring structure 35 includes a first saddle component 80 having a first conduit 83 extending outwardly therefrom, and a second saddle component 86 having a second conduit 89 extending outwardly therefrom. First saddle component 80 has a first terminal end 92 and a second terminal end 95, each having an extension 98 having an aperture 101. Second saddle component 86 has a first terminal end 104 and a second terminal end 107, each having an extension 110 and an aperture (not visible in the drawings). The aperture 101 of extension 98 of the first terminal end 92 of the first saddle component 80, and the aperture (not visible) of the extension 110 of the first terminal end 104 of the second saddle component 86, together define an aligned aperture 113 that is dimensioned to receive a fastener 116 therethrough or therein (FIG. 7).

The aperture 101 of the extension 98 of the second terminal end 95 of the first saddle component 80, and the aperture (not visible) of the extension 110 of the second terminal end 107 of the second saddle component 86, together define an aligned aperture 119 that is dimensioned to receive a fastener therethrough or therein (not visible in the drawings).

The first saddle component and the second saddle component of the exterior ring structure have substantially the same configuration, in an embodiment of the present invention. Having the same configuration allows the first and second saddle components to be interchanged with each other. For purposes of non-limiting illustration and with reference to FIG. 1, first saddle component 44 and second saddle component 47 have substantially the same configuration, as shown. More particularly, first terminal end 50 of first saddle component 44 and second terminal end 65 of second saddle component 47 have substantially the same configuration, and each have a single extension (56, 68) each having an aperture therethrough (59, 71). Second terminal end 53 of first saddle component 44 and first terminal end 62 of second saddle component 47 have substantially the same configuration, and each have spaced apart extensions (56, 68) each having an aperture therethrough (59, 71).

For purposes of further non-limiting illustration and with reference to FIG. 6, first saddle component 80 and second saddle component 86 of exterior ring structure 35 have substantially the same configuration, as shown. In particular, first terminal end 92 of first saddle component 80 and first terminal end 104 of second saddle component 86 have substantially the same configuration, and each have a lateral extension (98, 110) each having an aperture therethrough (e.g., 101). Second terminal end 95 of first saddle component 80 and second terminal end 107 of second saddle component 86 have substantially the same configuration, and each have a lateral extension (98, 110) each having an aperture therethrough (e.g., 101).

In an embodiment, and for purposes of attaching the interior housing and the exterior ring structure together, the interior housing and the exterior ring structure together define at least two separate pairs of aligned bores that are each dimensioned to receive a fastener therethrough. With reference to, for example, FIGS. 4 and 5, pressure vessel 3 includes an interior housing 121 that is substantially similar to interior housing 11 as described previously herein, and an exterior ring structure 26.

Sidewall 14 of interior housing 121 includes four outwardly extending barrels 123 each having a vertical bore therethrough (not visible in the drawings). Only three barrels 123 are visible in FIGS. 4 and 5. Exterior ring structure 26 has four outwardly extending barrel portions 126 that each include a vertical bore 129. Only two barrel portions 126 are visible in FIGS. 4 and 5. The bores 129 of the barrel portions 126 of the exterior ring structure 26, are aligned with the bores (not visible) of the barrels 123 of interior housing 121, and together form four pairs of aligned bores 132 (only two of which are visible in FIGS. 4 and 5).

Figure 4:
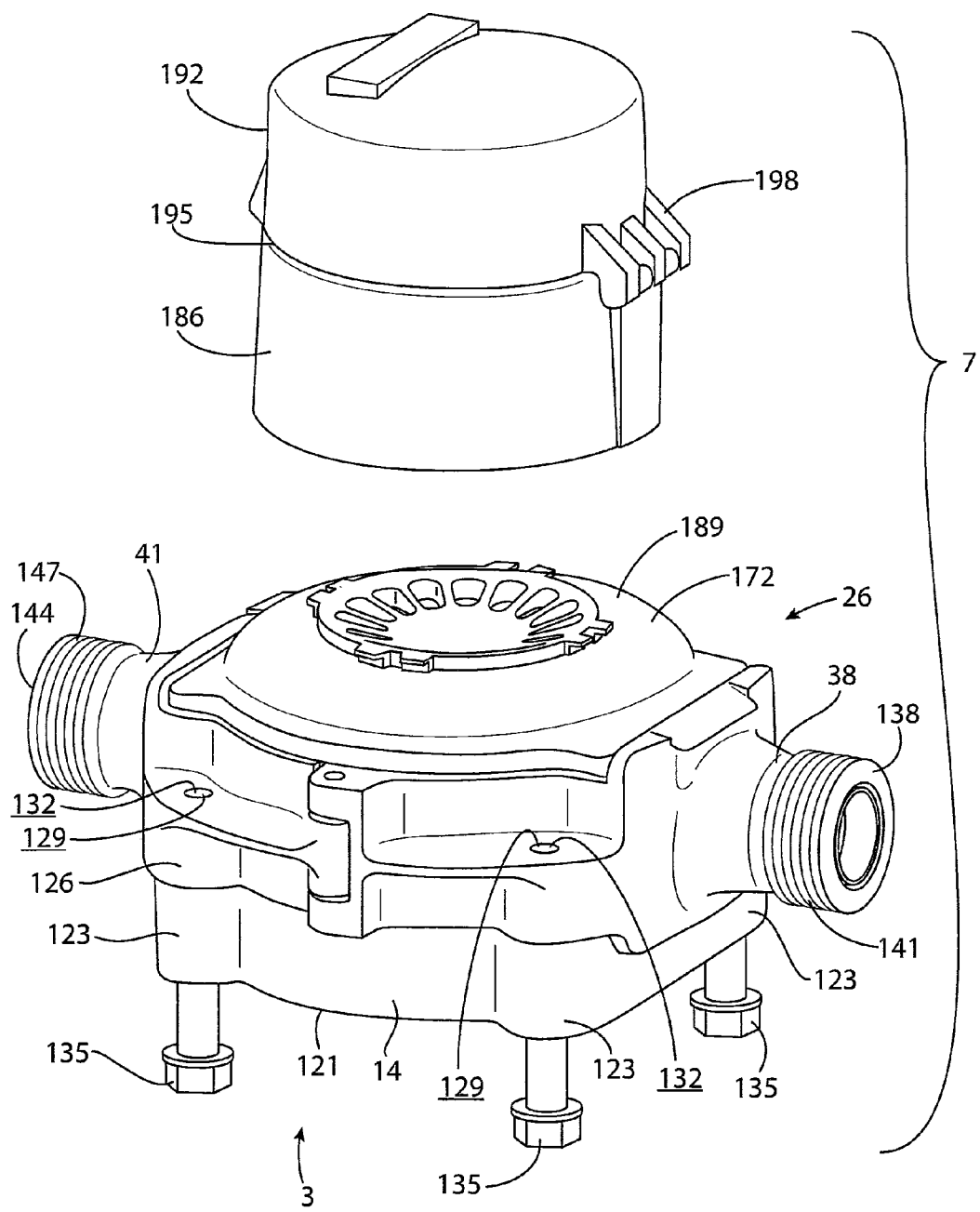
FIG. 4 is a representative partially exploded perspective view of a fluid flow meter that includes the fluid flow meter pressure vessel according to the present invention.
Figure 5:
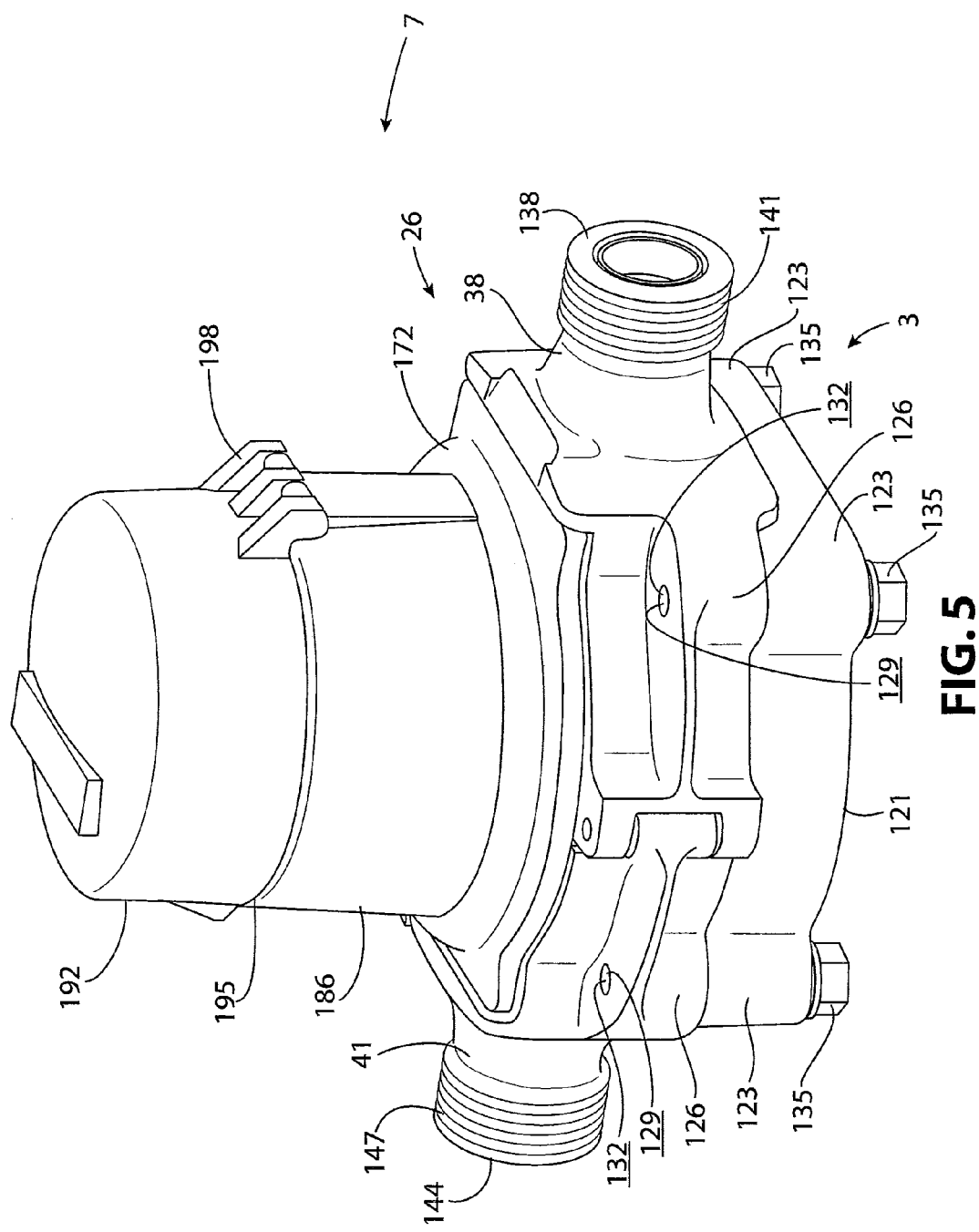
FIG. 5 is a representative non-exploded perspective view of the fluid flow meter of FIG. 4.

Each aligned bore 132 is dimensioned to receive a fastener therethrough (or therein). As depicted in FIGS. 4 and 5, aligned bores 132 each have a bolt 135 received therein. Only three of the four bolts 135 are visible in FIGS. 4 and 5.

In an embodiment of the present invention, the bore 129 of each barrel portion 126 of exterior ring structure 26 has internal threading. Each bolt 135 is inserted into each aligned bore 132 up through the vertical bore of each barrel 123 of internal housing 121, and then into the bore 129 of exterior ring structure 26, aligned therewith. Threads at the end of each bolt 135 engage threadingly with the interior threads of each bore 129 of exterior ring structure 26. Bolts 135 are typically fabricated from metal. Such an arrangement in which the metal threads of a bolt 135 engage threadingly with the internal threads of a metal bore 129 provides a more secure attachment of the internal housing 121 and the exterior ring structure 26 together, compared to the metal threads of a bolt engaging threadingly with the internal threads of a plastic bore (which is prone to stripping out).

The conduits of the pressure vessel of the present invention may be attached to separate conduits (not shown) by known connection arrangements, such as, quick disconnects, threaded connections, and solder. In a particular embodiment, a terminal portion of the first conduit has exterior threads, and a terminal portion of the second conduit has exterior threads. With reference to FIGS. 1-5, first conduit 38 has a terminal portion 138 having external threads 141, and second conduit 41 has a terminal portion 144 having external threads 147. Alternatively, or in addition to external threads, terminal portions of the first and second conduits may each independently have internal threads.

The threads (e.g., external threads) of the terminal portions of the conduits of the external ring structure may each threadingly engage with the threads (e.g., internal threads) of the coupling of a separate conduit (not shown) in accordance with art-recognized connection arrangements. A seal, such as, a flat gasket 150 (FIG. 3) may be included between the conduits of the exterior ring structure and the couplings into which the external threads thereof are threadingly received.

To further minimize the contact of fluids, passing through the pressure vessel, with metal components, the pressure vessel of the present invention may further include a first conduit liner residing within the first conduit, and a second conduit liner residing within the second conduit, of the exterior ring structure. The first and second conduit liners are fabricated from plastic, and are adapted and dimensioned to substantially prevent contact of fluid (e.g., water) passing therethrough with the interior surfaces of the respective first and second conduits.

Alternatively, or in addition to conduit liners, the interior surfaces of the first and second conduits may each be independently coated with a non-metallic coating (not shown), such as, an organic coating (e.g., a thermoset coating and/or a thermoplastic coating). For example, a thermoplastic powder coating may be applied to the interior surfaces of the first and/or second conduits, and then fused thereover by means of exposure to elevated temperature in accordance with art-recognized methods. The organic coating substantially prevents contact of fluid (e.g., water) passing through the first and second conduits, with the interior surfaces of the respective first and second conduits. The organic coating may include one or more of those classes and examples of thermosetting materials and/or thermoplastic materials, and optional reinforcing agents and/or additives as described in further detail herein below, with the weight basis being based on the solids weight of the coating composition.

Figure 3:
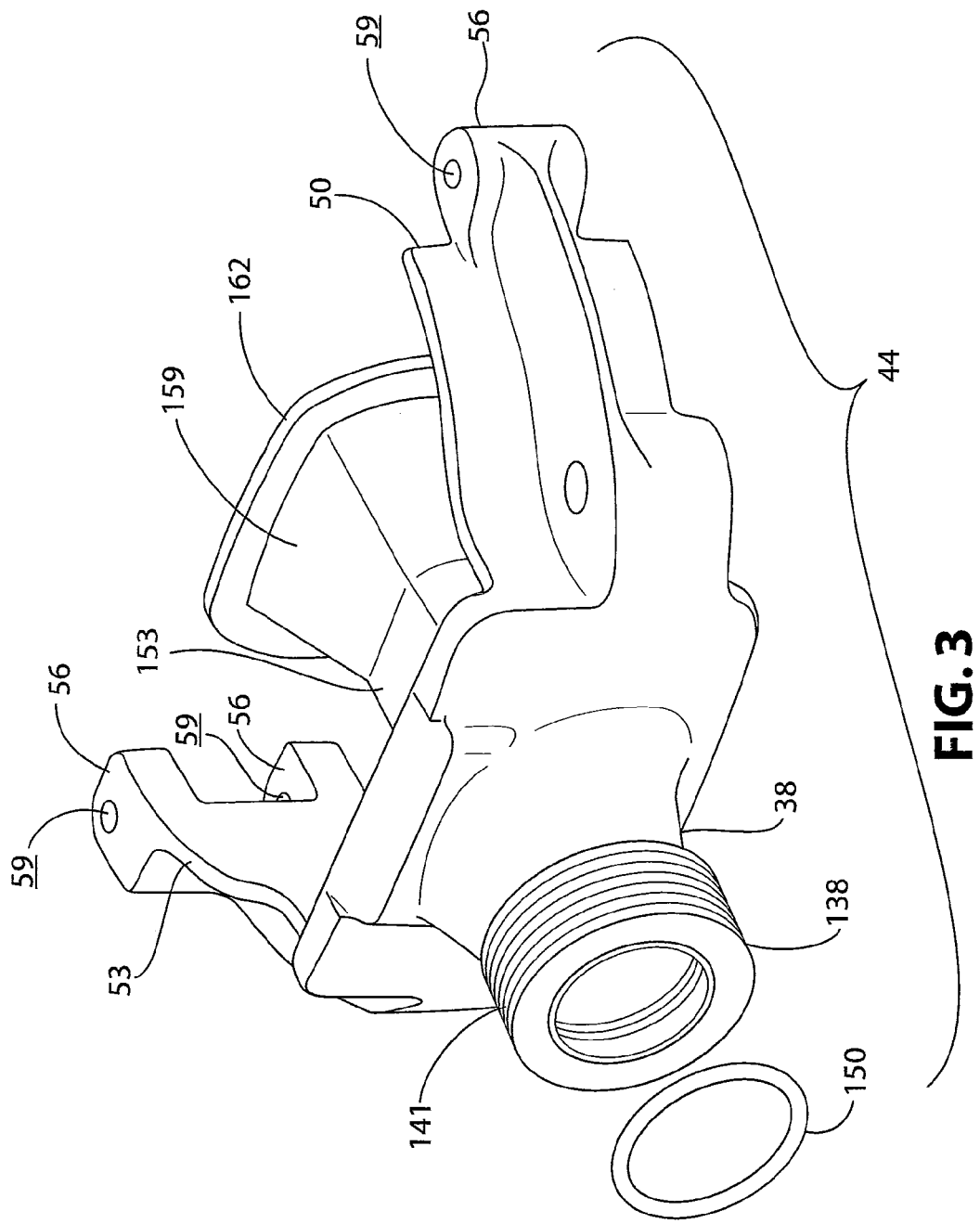
FIG. 3 is a representative exploded perspective view of a saddle component of the exterior ring structure of the fluid flow meter pressure vessel according to the present invention.

With reference to FIGS. 1 and 3, exterior ring structure 26 includes a first conduit liner 153 that resides within first conduit 38 thereof, and a second conduit liner 156 (only partially visible) that resides within second conduit 41 thereof. Each conduit liner 153, 156 may include an outwardly flared portion having a terminal flange. For example, first conduit liner 153 has an outwardly flared portion 159 having a terminal flange 162. The terminal flange of the conduit liner 159 may engage sealingly with a seal positioned on sidewall 14 of internal housing 11 and around the first or second apertures 20, 23 thereof. With reference to FIG. 1, first aperture 20 of sidewalls 14 of interior housing 11 has a seal 165 associated therewith that engages sealingly with first conduit liner 153. Second aperture 23 of sidewalls 14 of interior housing 11 has a seal 168 associated therewith that engages sealingly with second conduit liner 156.

Figure 2:
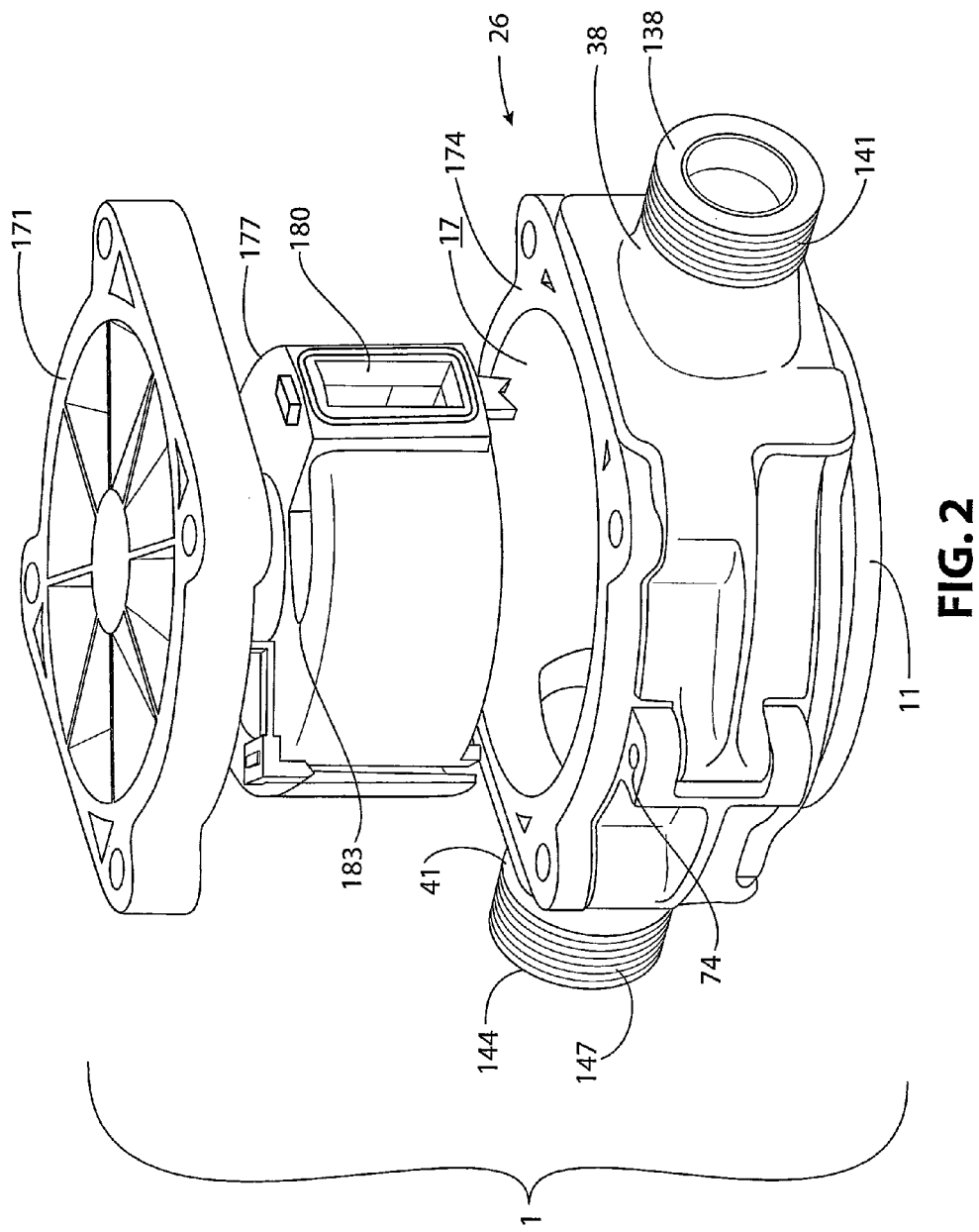
FIG. 2 is a representative partially exploded perspective view of a fluid flow meter pressure vessel according to the present invention that further includes a cap and an internal meter housing.

The interior housing 11 of the pressure vessel 1 of the present invention may include a cap (or plate) 171 that is attached to lower (or terminal) portions of the sidewalls of the interior housing 11. The cap (or lower cap) 171 serves to enclose and further define the internal chamber 17 of the interior housing 11. With reference to FIG. 2, interior housing 11 includes a cap 171 that is attached to lower (or terminal) portion 174 of sidewalls 14 of interior housing 11, by art-recognized attachment arrangements, such as, fasteners and/or adhesives (not shown).

The pressure vessel 1 of the present invention may further include an internal meter housing residing within the internal chamber 17 of the interior housing 11. The internal meter housing includes a first opening that is in fluid communication with the first aperture 20 of the interior housing 11, and a second opening that is in fluid communication with the second aperture 23 of said interior housing. The meter housing typically includes art-recognized fluid flow metering mechanisms (e.g., positive displacement mechanisms, or turbine mechanisms).

With reference to FIG. 2, pressure vessel assembly 1 further includes an internal meter housing 177 that resides within internal chamber 17 of interior housing 11. Internal meter housing 177 has a first opening 180 and a second opening 183 (not fully visible in the drawings). First opening 180 is in fluid communication with first aperture 20 of sidewall 14 of interior housing 11, and second opening 183 is in fluid communication with second aperture 23 of sidewalls 14 of interior housing 11. A fluid, such as water, entering through second conduit 41, through second aperture 23, through second opening 183, through internal meter housing 177, engages with the metering mechanism well known in the art therein (not shown), and passes out through first opening 180, through first aperture 20, and out through first conduit 38.

The present invention also relates to a fluid flow meter that includes the fluid flow meter pressure vessel of the present invention. The fluid flow meter also typically further includes a meter register housing attached to an upper surface of a top cap of the pressure vessel, and a lid hingedly attached to an upper portion of the meter register housing.

With reference to FIGS. 4 and 5, fluid meter 7 includes pressure vessel assembly 3, as described previously herein, and a meter register housing 186 that is attached to an upper surface 189 of top cap 172. The meter register housing 186 further includes a lid 192 that is hingedly attached to an upper portion 195 of meter register housing 186, by means of a hinge 198.

Figure 9:
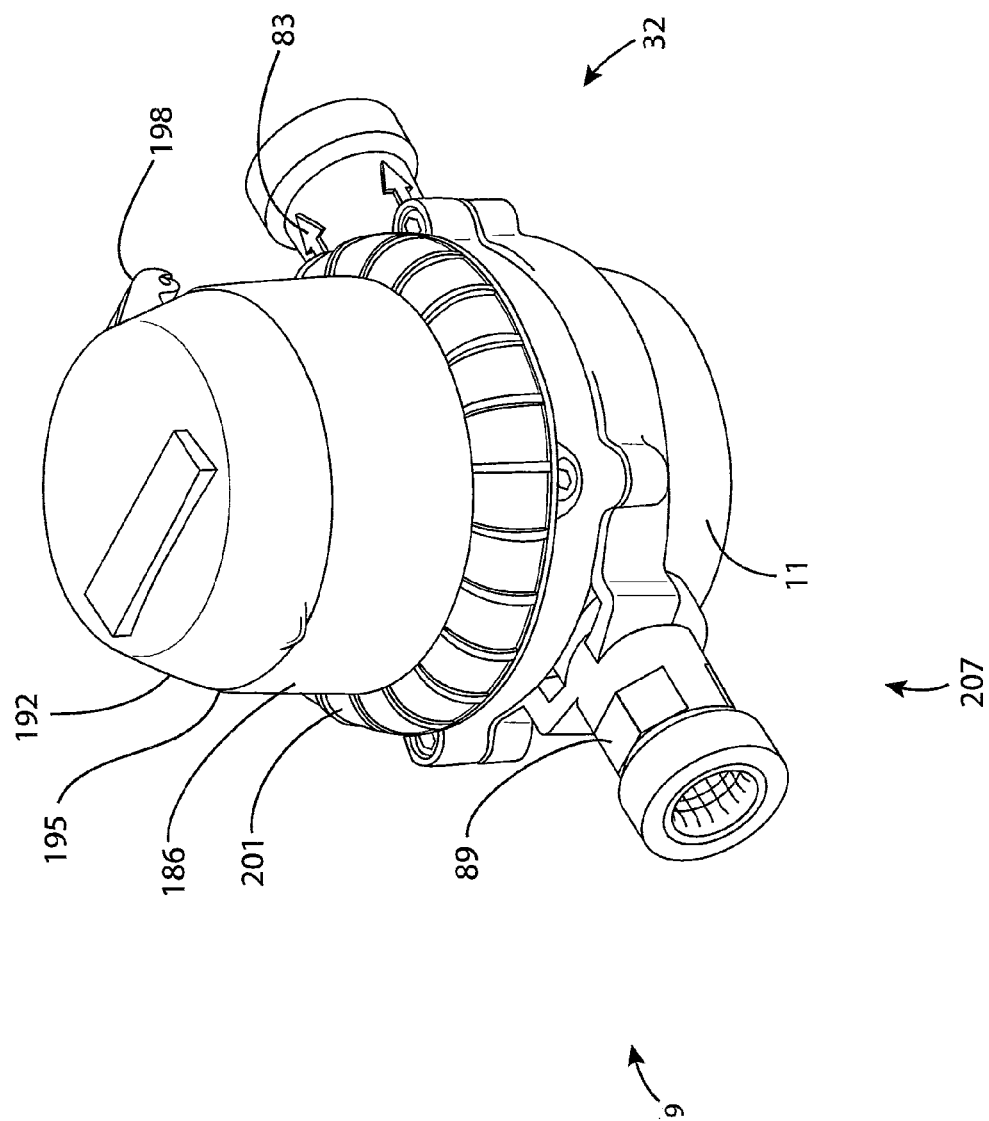
FIG. 9 is a representative perspective view of a fluid flow meter according to the present invention that includes the substantially unitary exterior ring structure of FIG. 8.

The meter register housing includes an art-recognized meter-registering arrangement (not shown) that registers metering information from the metering mechanism (not shown) that typically resides within the internal chamber of the interior housing of the underlying pressure vessel assembly, in accordance with art-recognized arrangement. The meter register housing may be attached to the underlying pressure vessel assembly by art-recognized arrangements, such as fasteners, adhesives, and/or snap-fittings (not shown). In an embodiment, the meter register housing may be attached to the underlying pressure vessel assembly by means of a skirt that engages (e.g., threadingly or snap-fittingly) with the underlying pressure vessel assembly. With reference to FIGS. 7 and 9, fluid meters 8 and 9 each include a skirt 201 that engages fittingly with the underlying pressure vessel assembly 204 or 207.

The plastic components of the pressure vessel assembly, such as, the interior housing (e.g., 11) and caps (e.g., caps 171 and 172) (or plates) thereof, and conduit liners (e.g., 153 and 156) are fabricated from one or more plastic materials. The plastic materials may be selected from thermoset plastic materials and/or thermoplastic materials, such as, engineering plastics.

As used herein and in the claims, the term "thermoset plastic material" and similar terms, such as, "thermosetting or thermosetable plastic materials" means plastic materials having, or that form, a three-dimensional crosslinked network resulting from the formation of covalent bonds between chemically reactive groups, e.g., active hydrogen groups and free isocyanate groups, or between unsaturated groups.

Thermoset plastic materials from which the plastic components of the pressure vessel assembly (e.g., interior housing, caps, and conduit liners) may be fabricated, include those known to the skilled artisan, e.g., crosslinked polyurethanes, crosslinked polyepoxides, crosslinked polyesters, and crosslinked polyunsaturated polymers. The use of thermosetting plastic materials typically involves the art-recognized process of reaction injection molding. Reaction injection molding typically involves, as is known to the skilled artisan, injecting separately, and preferably simultaneously, into a mold, for example: (i) an active hydrogen functional component (e.g., a polyol and/or polyamine); and (ii) an isocyanate functional component (e.g., a diisocyanate, such as, toluene diisocyanate, and/or dimers and trimers of a diisocyanate such as toluene diisocyanate). The filled mold may optionally be heated to ensure and/or hasten complete reaction of the injected components.

As used herein and in the claims, the term "thermoplastic material" and similar terms, means a plastic material that has a softening or melting point, and is substantially free of a three-dimensional crosslinked network resulting from the formation of covalent bonds between chemically reactive groups, e.g., active hydrogen groups and free isocyanate groups. Examples of thermoplastic materials from which the plastic components of the pressure vessel assembly (e.g., interior housing, cap, and conduit liners) may be fabricated include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic(meth)acrylates, thermoplastic acrylonitrile-butadiene-styrene, thermoplastic styrene-acrylonitrile, thermoplastic acrylonitrile-styrene-acrylate, and combinations thereof (e.g., blends and/or alloys of at least two thereof).

The plastic material from which the plastic components of the pressure vessel assembly (e.g., interior housing, cap, and conduit liners) may be fabricated, may optionally include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc, and mixtures thereof. If present, the reinforcing material is typically present in a reinforcing amount, e.g., in an amount of from 5 percent by weight to 60 or 70 percent by weight, based on the total weight of the component. The reinforcing fibers, and the glass fibers, in particular, may have sizings on their surfaces to improve miscibility and/or adhesion to the plastic materials into which they are incorporated, as is known to the skilled artisan.

In addition, or alternatively, to reinforcing material(s), the plastic materials of the plastic components of the pressure vessel assembly (e.g., interior housing, cap, and conduit liners) may optionally include one or more additives. Additives that may be present in the plastic materials of the interior housing include, but are not limited to, antioxidants, colorants, e.g., pigments and/or dyes, mold release agents, fillers, e.g., calcium carbonate, ultraviolet light absorbers, fire retardants, and mixtures thereof. Additives may be present in the plastic material in functionally sufficient amounts, e.g., in amounts independently from 0.1 percent by weight to 10 percent by weight, based on total weight.

The pressure vessel assembly and fluid flow meter of the present invention may be used to measure the fluid flow of any suitable fluid, such as, gasses and/or liquids. Typically, the pressure vessel assembly and fluid flow meter of the present invention are used to measure the fluid flow of liquids, such as, but not limited, to water. In an embodiment, the fluid flow meter of the present invention is a water meter.

The present invention has been described with reference to specific details of particular embodiments thereof. It is not intended that such details be regarded as limitations upon the scope of the invention except insofar as and to the extent that they are included in the accompanying claims.

What is claimed is:

1. A fluid flow meter pressure vessel assembly comprising:
   (a) an interior housing having sidewalls and an internal chamber, said sidewalls of said interior housing having a first aperture and a second aperture that are each in fluid communication with said internal chamber, said interior housing being fabricated from plastic; and
   (b) an exterior ring structure encompassing at least a portion of an exterior of said sidewalls of said interior housing, said exterior ring structure comprising a first conduit and a second conduit, said first conduit being in fluid communication with said first aperture of said interior housing, said second conduit being in fluid communication with said second aperture of said interior housing, said first conduit and said second conduit each independently extending outwardly from said exterior ring structure, said exterior ring structure being fabricated from metal
   wherein said exterior ring structure comprises a first saddle component comprising said first conduit, and a second saddle component comprising said second conduit, said first saddle component and said second saddle component being attached to each other; and
   wherein said interior housing and said exterior ring structure are attached to each other.

2. The fluid flow meter pressure vessel assembly of claim 1, wherein said exterior ring structure provides electrical conductivity between said first conduit and said second conduit, and around said exterior of said sidewalls of said interior housing.

3. The fluid flow meter pressure vessel assembly of claim 1, wherein said first saddle component comprises a first terminal end and a second terminal end each comprising at least one extension having an aperture, and said second saddle component comprises a first terminal end and a second terminal end each comprising at least one extension having an aperture,
   said aperture of said extension of said first terminal end of said first saddle
   component being aligned with said aperture of said extension of said first terminal end of said second saddle component and together forming first aligned apertures that are dimensioned to receive a first fastener therethrough, and
   said aperture of said extension of said second terminal end of said first saddle component being aligned with said aperture of said extension of said second terminal end of said second saddle component and together forming second aligned apertures that are dimensioned to receive a second fastener therethrough,
   thereby attaching said first saddle component and said second saddle component together.

4. The fluid flow meter pressure vessel of claim 3, wherein said first saddle component and said second saddle component have substantially the same configuration.

5. The fluid flow meter pressure vessel of claim 1, wherein said first saddle component and said second saddle component have substantially the same configuration.

6. The fluid flow meter pressure vessel assembly of claim 1, wherein said interior housing and said exterior ring structure together define at least two separate pairs of aligned bores that are each dimensioned to receive a fastener therethrough, thereby attaching said interior housing and said exterior ring structure together.

7. The fluid flow meter pressure vessel assembly of claim 6, wherein for each pair of aligned bores the bore of said exterior ring structure comprises internal threading.

8. The fluid flow meter pressure vessel assembly of claim 1, wherein a terminal portion of said first conduit comprises exterior threads, and a terminal portion of said second conduit comprises exterior threads.

9. The fluid flow meter pressure vessel assembly of claim 1, further comprising a first conduit liner residing within said first conduit, said first conduit liner being fabricated from plastic, and a second conduit liner residing within said second conduit, said second conduit liner being fabricated from plastic.

10. The fluid flow meter pressure vessel assembly of claim 1, wherein said interior housing further comprises a cap, said cap being attached to an upper portion of said sidewalls of said interior housing, said cap enclosing and further defining said internal chamber of said interior housing.

11. A fluid flow meter comprising the fluid flow meter pressure vessel assembly of claim 10, and further comprising a meter register housing attached to an upper surface of a top cap of said fluid flow meter pressure vessel, and a lid hingedly attached to an upper portion of said meter register housing.

12. The fluid flow meter pressure vessel assembly of claim 1, further comprising an internal meter housing residing within said internal chamber of said interior housing, said internal meter housing comprising a first opening that is in fluid communication with said first aperture of said interior housing, and a second opening that is in fluid communication with said second aperture of said interior housing.

13. A fluid flow meter pressure vessel assembly comprising:
   (a) an interior housing having sidewalls and an internal chamber, said sidewalls of said interior housing having a first aperture and a second aperture that are each in fluid communication with said internal chamber, said interior housing being fabricated from plastic; and
   (b) an exterior ring structure encompassing at least a portion of an exterior of said sidewalls of said interior housing, said exterior ring structure comprising a first conduit and a second conduit, said first conduit being in fluid communication with said first aperture of said interior housing, said second conduit being in fluid communication with said second aperture of said interior housing, said first conduit and said second conduit each independently extending outwardly from said exterior ring structure, said exterior ring structure being fabricated from metal,
   wherein said interior housing and said exterior ring structure are attached to each other, said exterior ring structure provides electrical conductivity between said first conduit and said second conduit, and around said exterior of said sidewalls of said interior housing, and said exterior ring structure comprises a first saddle component comprising said first conduit, and a second saddle component comprising said second conduit, said first saddle component and said second saddle component being attached to each other.

14. A fluid flow meter pressure vessel assembly comprising:
  (a) an interior housing having sidewalls and an internal chamber, said sidewalls of said interior housing having a first aperture and a second aperture that are each in fluid communication with said internal chamber, said interior housing being fabricated from plastic; and
  (b) an exterior ring structure encompassing at least a portion of an exterior of said sidewalls of said interior housing, said exterior ring structure comprising a first conduit and a second conduit, said first conduit being in fluid communication with said first aperture of said interior housing, said second conduit being in fluid communication with said second aperture of said interior housing, said first conduit and said second conduit each independently extending outwardly from said exterior ring structure, said exterior ring structure being fabricated from metal, wherein said interior housing and said exterior ring structure are attached to each other, said exterior ring structure comprises a first saddle component comprising said first conduit, and a second saddle component comprising said second conduit, said first saddle component and said second saddle component being attached to each other, said first saddle component comprises a first terminal end and a second terminal end each comprising at least one extension having an aperture, and said second saddle component comprises a first terminal end and a second terminal end each comprising at least one extension having an aperture, said aperture of said extension of said first terminal end of said first saddle component being aligned with said aperture of said extension of said first terminal end of said second saddle component and together forming first aligned apertures that are dimensioned to receive a first fastener therethrough, said aperture of said extension of said second terminal end of said first saddle component being aligned with said aperture of said extension of said second terminal end of said second saddle component and together forming second aligned apertures that are dimensioned to receive a second fastener therethrough, thereby attaching said first saddle component and said second saddle component together, and said interior housing and said exterior ring structure together define at least two separate pairs of aligned bores that are each dimensioned to receive a fastener therethrough, thereby attaching said interior housing and said exterior ring structure together.

\* \* \* \* \*

UNITED STATES PATENT AND TRADEMARK OFFICE
CERTIFICATE OF CORRECTION

PATENT NO. : 8,387,454 B2
APPLICATION NO. : 12/796741
DATED : March 5, 2013
INVENTOR(S) : Shaul Margalit et al.

It is certified that error appears in the above-identified patent and that said Letters Patent is hereby corrected as shown below:

In the Claims:

Column 10, Line 5, Claim 4, after "vessel" insert -- assembly --

Column 10, Line 8, Claim 5, after "vessel" insert -- assembly --

Signed and Sealed this
Twenty-eighth Day of May, 2013

Teresa Stanek Rea
*Acting Director of the United States Patent and Trademark Office*